Patented Jan. 29, 1952

2,583,584

UNITED STATES PATENT OFFICE 2,583,584

PRODUCTION OF HYDRAZINE HYDRATE

Walton H. Marshall, Jr., New York, N. Y., assignor to The M. W. Kellogg Company, Jersey City, N. J., a corporation of Delaware No Drawing. Application August 6, 1946,
Serial No. 688,718

14 Claims. (Cl. 23—190)

1

This invention relates to the production of hydrazine hydrate. More particularly the invention relates to an improved method for converting ammonia to hydrazine hydrate.

Heretofore hydrazine hydrate has been manufactured by reacting hypochlorite solution with ammonia, the hypochlorite solution being prepared from sodium hydroxide and chlorine. The reactants for the preparation of hydrazine hydrate by this method are, therefore, 2 molecules of ammonia, 1 molecule of chlorine, and 2 molecules of sodium hydroxide for each molecule of hydrazine hydrate. This method has the disadvantage that the relatively expensive reactants, sodium hydroxide and chlorine, are actually only intermediates in the process and are represented in the products as relatively worthless sodium chloride and water. Aside from the material loss which these products represent, their presence in the reaction product is a positive disadvantage, since they must be separated from the hydrazine hydrate product.

It is an object of this invention to provide an improved method for the conversion of ammonia to hydrazine hydrate, which method requires no expensive reagents other than ammonia, and which requires no reagents which are necessarily recovered in any form other than hydrazine hydrate. It is a further object of the invention to provide a process for manufacturing hydrazine hydrate in which the recovery of the hydrazine hydrate product is a relatively simple operation. It is a still further object of the invention to provide a process for making hydrazine hydrate at a unit cost substantially lower than that of the prior process referred to above.

In accordance with the improved method hydrazine hydrate is produced by directly oxidizing ammonia with oxygen. This improved method does not require the use of effective amounts of alkalis, halogens or hypohalites and, preferably, these reagents are entirely absent. The oxygen is supplied to the reaction as oxygen gas, either alone or in a mixture, such as air. The reaction is carried out under suitable conditions, to be described below, in the presence of a catalytic agent selected from the group consisting of silver, copper, and other metals of the right hand column of group I of the periodic table, tin, zinc, lead and cadmium, and their oxides. Other catalytic agents may be employed in combination with the above-named principal catalysts. For example, the catalytic agent may comprise silver oxide promoted with barium peroxide.

The improved process is carried out under carefully controlled reaction conditions. The temperature is maintained within the range of 100–400° C., preferably 200–300° C. The pressure should be relatively high in order to promote the reaction and also to facilitate the separation of the reaction product mixture into its components. Pressures within the range of 100 to 500 pounds per square inch, preferably 200 to 300 pounds per square inch, are employed.

The ammonia and oxygen should be supplied to the reaction zone in a molecular ratio of at least 5:1. Preferred ratios are in the range of 15:1 to 25:1, and it may be desirable to employ ratios of 50:1, or higher.

Operating conditions are controlled to limit the conversion of ammonia, per pass, to all products, e. g. the "disappearance" of ammonia, to no more than 20 percent of the ammonia charged to the reaction zone. It may be desirable to limit the disappearance of ammonia to no more than 5 percent per pass, and operations in which the ammonia is reacted at rates per pass in the range of 0.5 to 1 percent are within the scope of the invention. It is necessary, therefore, to limit the time of contact of the reactants with the catalyst within the range of 0.1 to 10 seconds, preferably 2 to 5 seconds. This corresponds to a space velocity, based on vaporized ammonia, of approximately 500–50,000 volumes per hour per volume of catalyst space, preferably 3000–7000. According to this special feature of the improved process secondary reactions, of hydrazine hydrate, are minimized and the yield of that product, per unit of ammonia consumed, is maintained at a high level.

The catalyst may be brought into contact with the reactants in any suitable manner. However, as it is important to maintain the temperature at the desired level, the catalyst suitably is prepared in granular form and mounted in a plurality of parallel tubes which are surrounded by a temperature control medium, such as a boiling liquid. Alternatively, the catalyst may be prepared as a powder and maintained in suspension in the gaseous reactants in the reaction zone by the passage of the reactants at suitable velocity upwardly through a mass of the powdered catalyst. To remove the heat of reaction from the powdered mass of catalyst, cooling coils may be provided in the reaction zone in contact with the catalyst powder, or a portion of the catalyst may be continuously withdrawn, cooled, and returned to the reaction zone. By maintaining the catalyst in suspension in the gaseous reactants in the reaction zone, by passing the reactants upwardly through the reaction zone at relatively low velocity whereby the powdered catalyst is maintained in a relatively dense, pseudo-liquid condition, the temperature in the reaction zone is maintained uniform throughout. In this operation, therefore, it is possible to absorb the heat of reaction by supplying the gaseous reactants to the reaction zone at a temperature such that they will absorb the heat of reaction in being heated to the reaction temperature by contact with the hot catalyst in the reaction zone.

In further explanation of the invention reference may be had to a specific example of the operation of the process. In this specific example, metallic silver in the form of porous granules is maintained in fixed position in a tubular reactor surrounded by a liquid held under a pressure effective to permit boiling of the liquid at about 260° C., corresponding to a reaction zone temperature of approximately 270° C. The reactor is maintained at a pressure of about 250 pounds per square inch. Ammonia and oxygen are charged to the reactor in an $NH_3:O_2$ ratio of about 20:1. The reactants are passed through the reaction zone at a space velocity of about 5,000 vapor volumes of ammonia, per hour, per volume of catalyst space, and the time of residence of the reactants in the reaction zone is limited to approximately 3 seconds in order to limit the conversion, per pass, of the ammonia to approximately 10 percent.

A method for producing hydrazine hydrate by contacting ammonia with a reducible metal oxide is disclosed in my co-pending application, S. N. 688,719 filed August 6, 1946.

I claim:

1. A method for producing hydrazine hydrate which comprises contacting ammonia with an effective quantity of oxygen in a gaseous state in a mol ratio of ammonia to oxygen of at least 5:1 at a temperature between about 100° C. and about 400° C. and at super-atmospheric pressure in the presence of a catalyst selected from the group consisting of silver, tin, zinc, lead, cadmium and their oxides, the contact time at the operating conditions selected being limited to restrict the disappearance of ammonia per pass to less than 20% of that charged to the reaction zone, such that hydrazine hydrate is produced.

2. The method of claim 1 in which the catalyst comprises silver.

3. The method of claim 1 in which the catalyst comprises silver promoted with barium peroxide.

4. A method for producing hydrazine hydrate which comprises contacting ammonia with an effective quantity of oxygen in a gaseous state in a mol ratio of ammonia to oxygen of at least 5:1 at a temperature between about 100° C. and about 400° C. and at a pressure of at least 100 pounds per square inch in the presence of a catalyst selected from the group consisting of silver, tin, zinc, lead, cadmium and their oxides, the contact time at the operating conditions selected being limited to restrict the disappearance of ammonia per pass to less than 20% of that charged to the reaction zone, such that hydrazine hydrate is produced.

5. A method for producing hydrazine hydrate which comprises contacting ammonia with an effective quantity of oxygen in a gaseous state in a mol ratio of ammonia to oxygen of at least 5:1 at a temperature between about 100° C. and 400° C. and at a pressure between about 200 and about 300 pounds per square inch in the presence of a catalyst selected from the group consisting of silver, tin, zinc, lead, cadmium and their oxides, the contact time at the operating conditions selected being limited to restrict the disappearance of ammonia per pass to less than 20% of that charged to the reaction zone, such that hydrazine hydrate is produced.

6. A method for producing hydrazine hydrate which comprises contacting ammonia with an effective quantity of oxygen in a gaseous state in a mol ratio of ammonia to oxygen of at least 5:1 at a temperature between about 200° C. and about 300° C. and at super-atmospheric pressure in the presence of a catalyst selected from the group consisting of silver, tin, zinc, lead, cadmium and their oxides, the contact time at the operating conditions selected being limited to restrict the disappearance of ammonia per pass to less than 20% of that charged to the reaction zone, such that hydrazine hydrate is produced.

7. A method for producing hydrazine hydrate which comprises contacting ammonia with an effective quantity of oxygen in a gaseous state in a mol ratio of ammonia to oxygen of at least 5:1 at a temperature between about 100° C. and about 400° C. and at a pressure of at least 100 pounds per square inch in the presence of a catalyst selected from the group consisting of silver, tin, zinc, lead, cadmium and their oxides, for a contact time between about 0.1 and about 10 seconds whereby the disappearance of ammonia per pass is restricted to less than 20% of that charged to the reaction zone, such that hydrazine hydrate is produced.

8. A method for producing hydrazine hydrate which comprises contacting ammonia with an effective quantity of oxygen in a gaseous state in 15:1 and about 25:1 at a temperature between about 100° C. and about 400° C. and at a pressure of at least 100 pounds per square inch in the presence of a catalyst selected from the group consisting of silver, tin, zinc, lead, cadmium and their oxides, for a contact time between about 0.1 and about 10 seconds whereby the disappearance of ammonia per pass is restricted to less than 20% of that charged to the reaction zone, such that hydrazine hydrate is produced.

9. A method for producing hydrazine hydrate which comprises contacting ammonia with an effective quantity of oxygen in a gaseous state in a mol ratio of ammonia to oxygen of at least 5:1 at a temperature between about 100° C. and about 400° C. and at a pressure of at least 100 pounds per square inch in the presence of a catalyst selected from the group consisting of silver, tin, zinc, lead, cadmium and their oxides, for a contact time between about 2 and about 5 seconds whereby the disappearance of ammonia per pass is restricted to less than 20% of that charged to the reaction zone, such that hydrazine hydrate is produced.

10. A method for producing hydrazine hydrate which comprises contacting ammonia with an effective quantity of oxygen in a gaseous state in a mol ratio of ammonia to oxygen between about 15:1 and about 25:1 at a temperature between about 100° C. and about 400° C. and at a pressure of at least 100 pounds per square inch in the presence of a catalyst selected from the group consisting of silver, tin, zinc, lead, cadmium and their oxides, for a contact time between about 2 and about 5 seconds whereby the disappearance of ammonia per pass is restricted to less than 20% of that charged to the reaction zone, such that hydrazine hydrate is produced.

11. A method for producing hydrazine hydrate which comprises contacting ammonia with an effective quantity of oxygen, in a gaseous state in a mol ratio of ammonia to oxygen between about 15:1 and about 25:1 at a temperature between about 200° C. and about 300° C. and at a pressure of at least 100 pounds per square inch in the presence of a catalyst comprising an active agent selected from the ground consisting of silver and its oxides for a contact time between about 0.1 and about 10 seconds whereby the disappearance of ammonia per pass is restricted to less than 20% of that charged to the reaction zone, such that hydrazine hydrate is produced.

12. A method for producing hydrazine hydrate which comprises contacting ammonia with an effective quantity of oxygen in a gaseous state in a mol ratio of ammonia to oxygen between about 15:1 and about 25:1 at a temperature between about 200° C. and about 300° C. and at a pressure of at least 100 pounds per square inch in the presence of a barium peroxide promoted catalyst comprising an active agent selected from the group consisting of silver and its oxides for a contact time between about 0.1 and about 10 seconds whereby the disappearance of ammonia per pass is restricted to less than 20% of that charged to the reaction zone, such that hydrazine hydrate is produced.

13. A method for producing hydrazine hydrate which comprises contacting ammonia with an effective quantity of oxygen in a gaseous state in a mol ratio of ammonia to oxygen between about 15:1 and about 25:1 at a temperature between about 200° C. and about 300° C. and at a pressure between about 200 and about 300 pounds per square inch in the presence of a catalyst comprising an active agent selected from the group consisting of silver and its oxides for a contact time between about 2 and about 5 seconds whereby the disappearance of ammonia per pass is restricted to less than 20% of that charged to the reaction zone, such that hydrazine hydrate is produced.

14. A method for producing hydrazine hydrate which comprises contacting ammonia with an effective quantity of oxygen in a gaseous state in a mol ratio of ammonia to oxygen between about 15:1 and about 25:1 at a temperature between about 200° C. and about 300° C. and at a pressure between about 200 and about 300 pounds per square inch in the presence of a barium peroxide promoted catalyst comprising an active agent selected from the group consisting of silver and its oxides for a contact time between about 2 and about 5 seconds whereby the disappearance of ammonia per pass is restricted to less than 20% of that charged to the reaction zone, such that hydrazine hydrate is produced.

WALTON H. MARSHALL, JR.

REFERENCES CITED

The following references are of record in the file of this patent:

UNITED STATES PATENTS

| Number | Name | Date |
| --- | --- | --- |
| 1,237,884 | Ellis | Aug. 21, 1917 |
| 1,322,291 | Classen | Nov. 18, 1919 |
| 2,142,948 | Law | Jan. 3, 1939 |

OTHER REFERENCES

Handbuch der Anorganischem Chemie 1.1—1907, page 192, Gmelin-Kraut Chemical Abstracts (1930) page 1310, vol. 24.